United States Patent
Fechtenkötter et al.

(10) Patent No.: US 7,094,827 B2
(45) Date of Patent: Aug. 22, 2006

(54) THIXOTROPIC AGENTS COMPRISING ETHYLENE TERPOLYMER WAXES

(75) Inventors: Andreas Fechtenkötter, Ludwigshafen (DE); Lars Wittkowski, Mannheim (DE); Katrin Zeitz, Mannheim (DE); Michael Ehle, Ludwigshafen (DE); Siegfried Gast, Ludwigshafen (DE); Wolfgang Kasel, Nusslock (DE); Andreas Deckers, Flomborn (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/509,652

(22) PCT Filed: Apr. 8, 2003

(86) PCT No.: PCT/EP03/03613

§ 371 (c)(1),
(2), (4) Date: Sep. 29, 2004

(87) PCT Pub. No.: WO03/085054

PCT Pub. Date: Oct. 16, 2003

(65) Prior Publication Data

US 2005/0131131 A1    Jun. 16, 2005

(30) Foreign Application Priority Data

Apr. 10, 2002 (DE) .............................. 102 15 813

(51) Int. Cl.
*B05D 7/02* (2006.01)
(52) U.S. Cl. .................. 524/522; 524/556; 524/365; 525/330.2; 525/221; 525/227
(58) Field of Classification Search ................ 524/556, 524/365, 522; 525/330.2, 221, 227
See application file for complete search history.

(56) References Cited

U.S. PATENT DOCUMENTS

| | | | |
|---|---|---|---|
| 2,985,631 A * | 5/1961 | Jones et al. ............... 526/219.3 |
| 3,215,678 A | 11/1965 | Adelman | |
| 4,200,561 A * | 4/1980 | Chang ......................... 524/269 |
| 4,296,019 A | 10/1981 | Nelson et al. | |
| 4,365,029 A | 12/1982 | Reizer et al. | |
| 4,406,705 A * | 9/1983 | Oeder et al. ................ 106/270 |
| 4,518,757 A | 5/1985 | Schulz et al. | |
| 4,523,929 A | 6/1985 | Duvdevani et al. | |
| 4,586,937 A | 5/1986 | Duvdevani et al. | |
| 4,599,377 A | 7/1986 | Duvdevani et al. | |
| 4,621,111 A | 11/1986 | Duvdevani et al. | |
| 4,625,745 A | 12/1986 | Kowalik et al. | |
| 4,715,865 A | 12/1987 | Kitano et al. | |
| 4,875,964 A | 10/1989 | Marius | |
| 4,880,436 A | 11/1989 | Kitano et al. | |
| 5,210,166 A * | 5/1993 | Ziegler et al. ........... 526/307.5 |
| 5,374,687 A | 12/1994 | Cooperman et al. | |
| 5,849,825 A | 12/1998 | Renz et al. | |
| 6,355,306 B1 | 3/2002 | Renz et al. | |

FOREIGN PATENT DOCUMENTS

WO        96/27620        9/1996

OTHER PUBLICATIONS

M. Buback et al., Chem. Ing. Tech. 1994, 66, 510.
Ullmann's Encyclopedia of Ind. Chem., 5th Ed. Keyword: Waxes, vol. A 28, p. 146 ff, VCH Weinheim, Basel, Cambridge, New York, Tokio, 1996.

* cited by examiner

*Primary Examiner*—Ling-Sui Choi
(74) *Attorney, Agent, or Firm*—Novak Druce & Quigg, LLP

(57) ABSTRACT

The invention relates to a method for producing thixotropic agents containing 0.1–30 wt.-% of at least one ethylene terpolymer wax, 5–7 wt.-% of at least one solvent, which is incompatible with the ethylene terpolymer wax, 5–85 wt.-% of of at least one solvent which is compatible with the ethylene terpolymer wax and with one or more of the first-named solvents.

9 Claims, No Drawings

THIXOTROPIC AGENTS COMPRISING ETHYLENE TERPOLYMER WAXES

The present invention relates to thixotropic agents comprising
from 0.1 to 30% by weight of at least one ethylene terpolymer wax,
from 5 to 70% by weight of at least one first solvent incompatible with the ethylene terpolymer wax, and
from 5 to 85% by weight of at least one solvent compatible with the ethylene terpolymer wax and with said first solvent(s).

As important components of coating materials, especially metallic paints, thixotropic agents are of critical significance for their application profile. Such thixotropic agents generally comprise at least one polymeric component. The function of thixotropic agents is, for example, to increase the aging stability and temperature stability of the coating materials. They are also intended to facilitate application of the coating materials in question, i.e., to lower the viscosity under the effect of shear forces, and ought also to lower the unwanted propensity of the coating materials to form drips following application—for that purpose, they ought to increase the viscosity of the coating systems in the absence of shear forces. Interest therefore attaches to extremely efficient thixotropic agents.

Furthermore, it is desirable to prepare thixotropic agents on the basis of starting materials which are as favorable as possible from an economic standpoint. Particularly favorable starting materials are polyethylene waxes.

In particular, thixotropic agents are used in finely dispersed form for two-coat metallic autofinishes, where they are intended to act as antisettling agents in the basecoat material. They reduce the rate of settlement of the pigment flakes of the metallic effect pigment as the paint film dries to such an extent that said flakes have sufficient time to orient themselves in one plane. This produces a higher gloss and the typical metallic appearance of the automotive finish, which is completed with the clearcoat (topcoat).

U.S. Pat. No. 4,200,561 discloses stable thixotropic gels comprising in the organic phase between 5 and 60% by weight of a gelling agent, between 5 and 50% by weight of a solvent which is incompatible with the gelling agent at room temperature, and from 20 to 90% by weight of a solvent which is compatible with the gelling agent and the other solvent. Said gelling agent is composed of at least 25% by weight of polyethylene waxes which in turn consist of from 40 to 96 mol % of ethylene and between 4 and 60 mol % of a comonomer selected from acrylic acid, methacrylic acid, ethacrylic acid, esterified acrylic acid, vinyl acetate, vinyl formate, vinyl propionate and mixtures thereof. On prolonged storage, however, crystallization of wax particles may be observed, and the fineness of the pastes is still in need of improvement. Accordingly, they are not sufficiently stable, especially for metallic paints with the present-day profile of requirements.

DE 31 09 950 discloses hard waxes comprising terpolymers of ethylene with unsaturated carboxylic acids and unsaturated carboxylic esters, and their use in the polish segment, particularly as a component of floor polishes, together with styrene-acrylic acid-acrylate dispersions. Further proposed applications include textile chemistry and plastics processing.

It is an object of the invention to provide
improved thixotropic agents,
a process for preparing improved thixotropic agents, and
applications for the improved thixotropic agents.

We have found that this object is achieved by the thixotropic agents defined at the outset.

The thixotropic agents of the invention comprise
from 0.1 to 30% by weight, preferably from 0.5 to 15% by weight, with particular preference at least 1 to 10% by weight, of at least one ethylene terpolymer wax,
from 5 to 70% by weight, preferably from 8 to 50% by weight, with particular preference from 10 to 20% by weight, of at least one first solvent incompatible with the ethylene terpolymer wax, and
from 5 to 85% by weight, preferably from 10 to 80% by weight, with particular preference from 30 to 60% by weight, of at least one solvent compatible with the ethylene terpolymer wax and with said first solvent(s).

The ethylene terpolymer waxes used in the thixotropic agents of the invention are waxlike terpolymers of ethylene and at least 2 comonomers, the waxes normally having a melt viscosity in the range from 20 to 70,000 mm$^2$/s and preferably from 800 to 2,000 mm$^2$/s, measured at 120° C. in accordance with DIN 51562. Their acid number is from 1 to 110, preferably from 10 to 110, mg KOH/g wax, determined in accordance with DIN 53402; in particular it is from 30 to 50 mg KOH/g wax. The melting points are situated in the range from 60 to 110° C., preferably in the range from 80 to 109° C., determined by DSC in accordance with DIN 51007. The density is commonly from 0.89 to 0.99 g/cm$^3$, preferably up to 0.96 g/cm$^3$, determined in accordance with DIN 53479.

The ethylene terpolymer waxes used in the thixotropic agents of the invention are preferably composed of
from 80 to 99.9% by weight, more preferably from 93 to 99.5% by weight of ethylene,
from 0.1 to 20% by weight, more preferably from 0.5 to 7% by weight of at least two comonomers comprising
as first comonomer from 1 to 99%, more preferably from 30 to 70%, and with particular preference from 40 to 60% by weight of at least one $C_3$–$C_{12}$ alkenecarboxylic acid and
as second comonomer from 99 to 1%, more preferably from 70 to 30%, and with particular preference from 60 to 40% by weight of at least one ester of the formula I

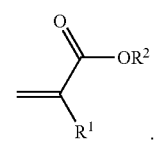

In formula I the variable $R^1$ is selected from
hydrogen,
$C_1$–$C_{10}$ alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl, n-decyl; with particular preference $C_1$–$C_4$ alkyl such as methyl, ethyl, n-propyl, isopropyl, n-butyl, isobutyl, sec-butyl and tert-butyl;
$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred;
$C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl.

$R^2$ is selected from $C_1–C_{10}$ alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, n-nonyl, n-decyl; with particular preference $C_1–C_4$ alkyl such as methyl, ethyl, n-propyl, isopropyl, n-butyl, isobutyl, sec-butyl and tert-butyl;

$C_3–C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; with particular preference cyclopentyl, cyclohexyl and cycloheptyl;

$C_6–C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl.

With very particular preference $R^1$ is selected from hydrogen and methyl, and $R^2$ is with very particular preference methyl.

$C_3–C_{12}$ alkenecarboxylic acids are unsaturated carboxylic acids which form copolymers and/or terpolymers with ethylene under the conditions of free-radical polymerization. They preferably have a C—C double bond in conjugation to the carboxyl group; that is, they are α,β-unsaturated carboxylic acids. Examples include the following: acrylic acid, (E)-crotonic acid, (Z)-crotonic acid, and mixtures of the last two, methacrylic acid, ethacrylic acid, (E)-1-butenylic acid, (E)-1-pentenylic acid, (E)-1-heptenylic acid, (E)-1-undecenylic acid. Acrylic and methacrylic acids are preferred. Very particular preference is given to acrylic acid.

The thixotropic agents of the invention may also comprise ethylene terpolymer waxes prepared, for example, by copolymerizing ethylene, a compound of the formula I, and two $C_3–C_{12}$ alkenecarboxylic acids. Likewise suitable for use as thixotropic agents are polyethylene waxes obtainable by copolymerizing ethylene, a $C_3–C_{12}$ alkenecarboxylic acid, and two compounds of the formula I.

In another embodiment of the present invention the ethylene terpolymer waxes present in the thixotropic agents of the invention comprise ethylene, a $C_3–C_{12}$ alkenecarboxylic acid, and a compound of the formula I plus up to 10% by weight, based on the sum of the aforementioned comonomers, of a fourth comonomer, vinyl acetate or vinyl formate for example.

The ethylene terpolymer waxes present in the thixotropic agents of the invention are known per se and are prepared by conventional methods, preferably by the prior art method (cf., for example, *Ullmann's Encyclopedia of Industrial Chemistry*, 5th edition, entry: Waxes, Vol. A 28, p. 146 ff., VCH Weinheim, Basel, Cambridge, New York, Tokyo, 1996) of direct free-radical copolymerization of ethylene with acrylic acid or acrylates.

The ethylene terpolymer waxes can be prepared in stirred high pressure autoclaves or in high pressure tube reactors. Preparation in stirred high pressure autoclaves is preferred. The stirred high pressure autoclaves employed for the processes of the polyethylene waxes present in the thixotropic agents of the invention are known: a description can be found in *Ullmann's Encyclopedia of Industrial Chemistry*, 5th edition, entry: Waxes, Vol. A 28, p. 146 ff., VCH Weinheim, Basel, Cambridge, New York, Tokyo, 1996. Their length/diameter ratio is situated predominantly in ranges from 5:1 to 30:1, preferably from 10:1 to 20:1. The high pressure tube reactors which can likewise be employed can also be found in *Ullmann's Encyclopedia of Industrial Chemistry*, 5th edition, entry: Waxes, Vol. A 28, p. 146 ff., VCH Weinheim, Basel, Cambridge, New York, Tokyo, 1996.

Suitable pressure conditions for the polymerization are from 1000 to 3500 bar, preferably from 1500 to 2500 bar. The reaction temperatures are situated within the range from 160 to 320° C., preferably in the range from 200 to 280° C.

Regulators used include, for example, an aliphatic aldehyde or an aliphatic ketone of the formula II

or mixtures thereof.

In formula II the radicals $R^3$ and $R^4$ are identical or different and are selected from hydrogen;

$C_1–C_6$ alkyl such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, with particular preference $C_1–C_4$ alkyl such as methyl, ethyl, n-propyl, isopropyl, n-butyl, isobutyl, sec-butyl and tert-butyl;

$C_3–C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl, and cycloheptyl.

In one particular embodiment the radicals $R^3$ and $R^4$ are bonded covalently to one another to form a ring with from 4 to 13 members. For example, $R^3$ and $R^4$ together may be —(CH$_2$)$_4$—, —(CH$_2$)$_5$—, —(CH$_2$)$_6$—, —(CH$_2$)$_7$—, —CH(CH$_3$)—CH$_2$—CH$_2$—CH(CH$_3$)— or —CH(CH$_3$)—CH$_2$—CH$_2$—CH$_2$—CH(CH$_3$)—.

The use of propionaldehyde ($R^3$=H, $R^4$=C$_2$H$_5$) or ethyl methyl ketone ($R^3$=CH$_3$, $R^4$=C$_2$H$_5$) as regulators is especially preferred.

Further highly suitable regulators are unbranched aliphatic hydrocarbons such as propane, for example. Especially good regulators are branched aliphatic hydrocarbons with tertiary hydrogen atoms, examples being isobutane, isopentane, isooctane, and isododecane (2,2,4,6,6-pentamethylheptane). Isododecane is especially suitable. As further, additional regulators it is possible to use higher olefins such as propylene, for example.

The amount of regulator used corresponds to the amounts customary for the high pressure polymerization process.

Initiators for the free-radical polymerization that can be used are the customary free-radical initiators such as organic peroxides, oxygen or azo compounds, for example. Mixtures of two or more free-radical initiators are also suitable.

Free-radical initiators used include one or more peroxides selected from the substances available commercially didecanoyl peroxide, 2,5-dimethyl-2,5-di(2-ethylhexanoyl-peroxy)hexane, tert-amyl peroxy-2-ethylhexanoate, dibenzoyl peroxide, tert-butyl peroxy-2-ethylhexanoate, tert-butyl peroxydiethylacetate, tert-butyl peroxydiethylisobutyrate, 1,4-di(tert-butylperoxycarbo)cyclohexane as an isomer mixture, tert-butyl perisononanoate, 1,1-di(tert-butylperoxy)-3,3,5-trimethylcyclohexane, 1,1-di-(tert-butylperoxy)cyclohexane, methyl isobutyl ketone peroxide, tert-butyl peroxyisopropyl carbonate, 2,2-di-(tert-butylperoxy) butane or tert-butyl peroxyacetate;

tert-butyl peroxybenzoate, di-tert-amyl peroxide, dicumyl peroxide, the isomeric di(tert-butylperoxyisopropyl) benzenes, 2,5-dimethyl-2,5-di-tert-butylperoxyhexane, tert-butylcumyl peroxide, 2,5-dimethyl-2,5-di(tert-butylperoxy)hex-3-yne, di-tert-butyl peroxide, 1,3-diisopropyl monohydroperoxide, cumene hydroperoxide or tert-butyl hydroperoxide; or dimeric or trimeric ketone peroxides of the formula III a to III c.

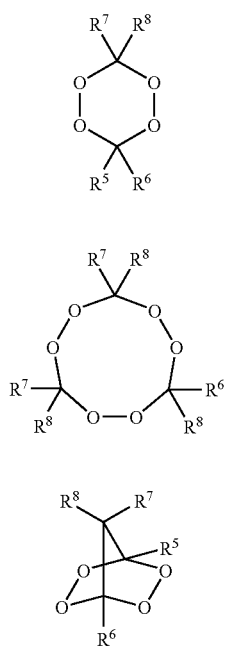

In these formulae the radicals $R^5$ to $R^8$ are identical or different and are selected from $C_1$–$C_8$ alkyl such as methyl, ethyl, n-propyl, isopropyl, n-butyl, sec-butyl, isobutyl, tert-butyl, n-pentyl, sec-pentyl, isopentyl, n-hexyl, n-heptyl, n-octyl; preferably linear $C_1$–$C_6$ alkyl such as methyl, ethyl, n-propyl, n-butyl, n-pentyl, n-hexyl, with particular preference linear $C_1$–$C_4$ alkyl such as methyl, ethyl, n-propyl or n-butyl, very particular preference being given to ethyl;

$C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl.

Peroxides of the formulae III a to III c and also processes for preparing them are known from EP-A 0 813 550.

Particularly suitable peroxides include di-tert-butyl peroxide, tert-butyl peroxypivalate, tert-butyl peroxyisononanoate, dibenzoyl peroxide, and mixtures thereof. An example that may be given of an azo compound is azobisisobutyronitrile (AIBN). The free-radical initiators are added in amounts customary for polymerizations.

The thixotropic agents of the invention further comprise from 5 to 70% by weight, preferably from 8 to 50% by weight, with particular preference from 10 to 20% by weight, of at least one solvent which is incompatible with the ethylene terpolymer wax. For the purposes of the present invention, solvents incompatible with the ethylene terpolymer wax are those whose solvency for the ethylene terpolymer wax in question is zero or very low, i.e., 1% by weight or less, at temperatures up to the boiling point of the respective solvent. They are generally polar solvents, examples being ethers, esters, ketones, alcohols, especially ethers such as diisopropyl ether, di-n-butyl ether, and also esters such as ethyl acetate, n-propyl acetate, n-butyl acetate, n-hexyl acetate, ethyl propionate, and ethyl butyrate; and also ketones such as methyl ethyl ketone, diethyl ketone, and methyl isobutyl ketone; and also alcohols such as n-butanol for example.

The thixotropic agents of the invention further comprise from 5 to 85% by weight, preferably from 10 to 80% by weight, with particular preference from 30 to 60% by weight, of at least one solvent which is compatible with the ethylene terpolymer wax and with the first solvent or solvents. For the purposes of the present invention, solvents compatible with the ethylene terpolymer wax and with the first solvent(s) are those having the capacity to dissolve the respective ethylene terpolymer wax at temperatures up to the boiling point, preferably at temperatures at least 10° C. below the boiling point, of the respective solvent in more than just minor fractions, i.e., which form clear solutions with strengths, for example, of at least 5 to 6% by weight, preferably from 20 to 30% by weight. Moreover, they must be miscible in any proportion with the first solvent as such, without phase separation. They include aromatic and aliphatic hydrocarbons, preferably those having from 7 to 11 carbon atoms, individually or as mixtures; examples include toluene, ethylbenzene, ortho-xylene, meta-xylene, and para-xylene; and also n-heptane, n-octane, isooctane, n-decane, and decalin; preference is given to toluene, ethylbenzene, ortho-xylene, meta-xylene or para-xylene; and also n-hexane, cyclohexane, n-heptane, n-octane, isooctane, n-decane and mixtures, such as mixtures of aliphatics, for example, known under the name petroleum ethers, or mixtures of aliphatic and aromatic hydrocarbons having 7 to 11 carbon atoms, which are known, for example, under the name solvent naphtha to BASF Aktiengesellschaft.

The thixotropic agents of the invention display very good thixotropic properties and an application profile which overall is superior to that of the prior art thixotropic agents.

The present invention further provides a process for preparing the thixotropic agents of the invention. To prepare the thixotropic agents of the invention the ethylene terpolymer wax, at least one first solvent incompatible with the ethylene terpolymer wax, and at least one solvent compatible with the ethylene terpolymer wax and with the first solvent(s) are mixed with one another. A preferred procedure is first of all to dissolve the ethylene terpolymer wax in one or more solvents compatible with said wax, at elevated temperature, for example, until a clear solution is obtained. Dissolution can be accelerated, for example, by stirring or shaking. Then at least one solvent incompatible with the ethylene terpolymer wax is added. It is appropriate to add the incompatible solvent(s) within a short period of time.

The present invention further provides for the use of the thixotropic agents of the invention. The thixotropic agents of the invention are outstandingly suitable as components of coating materials, especially metallic paints. Metallic paints, also referred to in the patent literature as metal effect coatings, and compositions suitable in principle are described, for example, in WO 87/05923. Use of the thixotropic agents of the invention as components of metallic paints, and metallic paints comprising the thixotropic agents of the invention, are further embodiments of the present invention. Finally, a process for preparing coating materials, especially metallic paints, by mixing the thixotropic agents of the invention with pigments, examples being aluminum particles, mica, metal bronzes or copper, is also provided by the present invention.

It has now surprisingly been found that the thixotropic agents of the invention are outstandingly suitable as components in metallic paints since they increase the thixotropy of the metallic paints. Highly thixotropic metallic paints are superior to their conventional counterparts because on storage the pigments, particularly the aluminum particles present in metallic paints, do not settle, which would otherwise lead to unwanted separation. Moreover, the coating materials of the invention lend themselves very well to applications on surfaces. The present invention therefore further provides surfaces coated with the coating materials of the invention and especially metallic paints comprising the thixotropic agents of the invention, and also a process for coating surfaces, especially metal surfaces, with the metallic paints of the invention; for example, bodywork surfaces, casings, and instruments. The surfaces coated in accordance with the invention exhibit excellent properties in respect, for example, of scratch resistance. Moreover, the surfaces coated in accordance with the invention are rendered outstandingly matt.

WORKING EXAMPLES

All volume data are based on room temperature and 1 bar, unless otherwise stated.

1. Preparation of the Ethylene Terpolymer Waxes

Ethylene, acrylic acid, and methyl acrylate were polymerized in a high pressure autoclave as described in the literature (M. Bubacku et al., *Chem. Ing. Tech.* 1994, 66, 510). For this polymerization, ethylene and the comonomer mixture of acrylic acid and methyl acrylate, to which about 1000 to 1500 ml·h$^{-1}$ of an initiator solution composed of tert-butyl peroxypivalate (0.02 mol·l$^{-1}$) in solution in isododecane were added, were fed in under the reaction pressure of 1700 bar. Metered in as regulator were 600 ml/h of a mixture of propionaldehyde and isododecane (volume ratio: 1:1). Table 1 lists the polymerization conditions and Table 2 the analytical data for the polymers obtained.

The amount of ethylene, acrylic acid, and methyl acrylate in the ethylene terpolymer waxes was determined by NMR spectroscopy and by titration (acid number). The acid number of the polymers was determined titrimetrically in accordance with DIN 53402. The consumption of KOH corresponds to the acrylic acid content of the polymer.

TABLE 1

Preparation of ethylene terpolymer waxes

| | | Monomer feed | | of which [each g h$^{-1}$] | | | |
|---|---|---|---|---|---|---|---|
| No. | $T_{reactor,max}$ [° C.] | ethylene [g h$^{-1}$] | comonomer + ID [ml · h$^{-1}$] | Acrylic acid | Methyl acrylate | Isododecane | Polymer [g h$^{-1}$] |
| 1 | 222 | 10000 | 990 | 43.0 | 43.0 | 689 | 2000 |
| 2 | 220 | 10000 | 1450 | 63.0 | 63.0 | 1009 | 2100 |
| 3 | 221 | 10000 | 1800 | 78.3 | 78.3 | 1252 | 2100 |
| 4 | 220 | 10000 | 2200 | 95.7 | 95.7 | 1530 | 2300 |
| 5 | 222 | 10000 | 960 | 44.7 | 89.3 | 625 | 2000 |
| 6 | 220 | 10000 | 1400 | 65.1 | 130.1 | 912 | 2000 |
| 7 | 221 | 10000 | 1870 | 87.0 | 174.0 | 1218 | 2100 |
| 8 | 220 | 10000 | 2180 | 101.4 | 202.8 | 1420 | 2200 |
| 9 | 221 | 10000 | 970 | 44.5 | 133.5 | 601 | 2100 |
| 10 | 220 | 10000 | 1400 | 64.2 | 192.7 | 867 | 2100 |
| 11 | 220 | 10000 | 1800 | 82.6 | 247.7 | 1115 | 2300 |
| 12 | 221 | 10000 | 2400 | 110.1 | 330.3 | 1486 | 2500 |
| 13 | 221 | 10000 | 1080 | 53.0 | 207.3 | 617 | 2500 |
| 14 | 219 | 10000 | 1500 | 73.7 | 288.0 | 857 | 2300 |
| 15 | 220 | 10000 | 1920 | 94.3 | 368.6 | 1097 | 2300 |
| 16 | 220 | 10000 | 2440 | 119.8 | 468.4 | 1394 | 2700 |
| 17 | 220 | 10000 | 1470 | 67 | 202.2 | 910.1 | 2200 |
| 18 | 220 | 10000 | 1550 | 68 | 68 | 1080 | 2100 |

Abbreviations used:
ID = isododecane.

The analytical data for the ethylene terpolymer waxes are given in Table 2. Table 2 also contains the data for comparison sample C1; C1 was prepared in analogy to wax 6 but without the use of methyl acrylate and using 5.5% by weight of acrylic acid in the feed. The acrylate content of the ethylene terpolymer wax C1 is 5.5% by weight.

TABLE 2

Analytical data of the ethylene terpolymer waxes

| No. | Ethylene [% by wt.] | Acrylic acid [% by wt.] | Methyl acrylate [% by wt.] | Acid number [mg KOH g$^{-1}$] | $\rho$ (23° C.) [g cm$^{-3}$] | $\eta$ 120° C. [mm$^2$ s$^{-1}$] | m.p. [° C.] |
|---|---|---|---|---|---|---|---|
| 1 | 96.8 | 1.7 | 1.5 | 13.1 | 0.927 | 1000 | 104.6 |
| 2 | 96.1 | 2.1 | 1.8 | 16.7 | 0.920 | 1140 | 103.1 |
| 3 | 94.4 | 2.7 | 2.9 | 20.9 | 0.928 | 1080 | 101.3 |
| 4 | 92.9 | 3.5 | 3.5 | 27.4 | 0.928 | 1020 | 98.7 |
| 5 | 95.0 | 1.8 | 3.3 | 13.9 | 0.931 | 1080 | 102.7 |
| 6 | 92.9 | 2.4 | 4.7 | 18.7 | 0.920 | 1070 | 100.0 |
| 7 | 90.4 | 3.1 | 6.5 | 24.4 | 0.930 | 1040 | 95.8 |
| 8 | 89.5 | 3.7 | 6.8 | 29.1 | 0.931 | 1070 | 92.8 |
| 9 | 92.6 | 1.7 | 5.7 | 13.1 | 0.930 | 900 | 100.4 |
| 10 | 92.2 | 2.3 | 5.5 | 18.0 | 0.929 | 1080 | 97.0 |
| 11 | 89.8 | 2.8 | 7.4 | 21.8 | 0.931 | 1020 | 93.5 |
| 12 | 86.3 | 3.4 | 10.2 | 26.8 | 0.933 | 1030 | 89.6 |
| 13 | 91.9 | 1.8 | 6.3 | 14.3 | 0.932 | 910 | 97.4 |
| 14 | 89.0 | 2.4 | 8.6 | 18.8 | 0.933 | 920 | 93.4 |
| 15 | 85.8 | 3.0 | 11.2 | 23.4 | 0.931 | 880 | 88.4 |
| 16 | 83.4 | 3.6 | 13.0 | 28.2 | 0.934 | 1020 | 84.6 |
| 17 | 91.4 | 6.4 | 2.2 | 21.2 | 0.940 | 1660 | 99.2 |
| 18 | 95.3 | 2.0 | 2.7 | 15.3 | 0.941 | 1770 | 105.7 |
| V1 | 95.5 | 4.5 | — | 43.0 | 0.930 | 1500 | 101.0 |

The melt viscosity was determined by means of DSC in accordance win DIN 51562, the melting points by DIN 51007.

2. Preparation of the Thixotropic Agents of the Invention and Testing for Thixotropy The performance testing was carried out without the addition of a pigment.

In a round-bottomed flask with dropping funnel, 12 g of ethylene terpolymer wax from Table 2 were heated with stirring at 105° C. with 82 g of Solvent naphtha (BASF Aktiengesellschaft) until a clear solution had formed. The solution was then cooled with stirring to 80° C. and 106 g of n-butyl acetate (room temperature) were added via the dropping funnel. A dispersed precipitate was formed. Finally, the mixture was cooled to 32° C. with stirring.

After storage at room temperature for at least 24 hours, the dispersions were taken up briefly and left to stand for a further 45 minutes. Then 0.5 g of the wax dispersion were placed on a horizontal glass plate. After a dwell time of one minute, the glass plate was stood up vertically. The measure used for the thixotropy was the distance (measurement range 0–40 cm) traveled by the applied wax dispersion in 2 minutes. If the measurement range was exceeded within 2 minutes, the time required for this was measured. The results are compiled in Table 3.

TABLE 3

Results of performance testing

| Wax | Travel Time [s] | Distance [cm] | Gloss at 60° | Remarks |
|---|---|---|---|---|
| C1 | 120 | 7 | 75 | Many large specks |
| 17 | 120 | 24 | 48 | Virtually no specks |
| 18 | 120 | 10 | 17 | Very few, small specks |

The invention claimed is:

1. A thixotropic agent comprising as components from 0.1 to 30% by weight of at least one ethylene terpolymer wax synthesized from from 80 to 99.9% by weight of ethylene, from 0.1 to 20% by weight of at least two comonomers comprising as first comonomer from 1 to 99% by weight of at least one $C_3$–$C_{12}$ alkenecarboxylic acid and as second comonomer from 99 to 1% by weight of at least one ester of the formula I

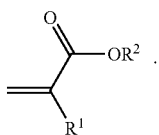 I where $R^1$ is selected from the group consisting of hydrogen, $C_1$–$C_{10}$ alkyl, $C_3$–$C_{12}$ cycloalkyl, and $C_6$–$C_{14}$ aryl
and $R^2$ is selected from the group consisting of $C_1$–$C_{10}$ alkyl, $C_3$–$C_{12}$ cycloalkyl, and $C_6$–$C_{14}$ aryl,
from 5 to 70% by weight of at least one first solvent incompatible with the ethylene terpolymer wax, and
from 5 to 85% by weight of at least one second solvent compatible with the ethylene terpolymer wax and with said first solvent(s).

2. A thixotropic agent as claimed in claim 1, wherein said first comonomer is acrylic acid.

3. A thixotropic agent as claimed in claim 1, wherein $R^1$ is hydrogen or methyl and $R^2$ is methyl in formula I.

4. A thixotropic agent as claimed in claim 1, wherein the ethylene copolymer wax is synthesized from from 90 to 99% by weight of ethylene and from 10 to 1% by weight of at least two comonomers comprising from 30 to 70% by weight of at least one $C_3$–$C_{12}$ alkenecarboxylic acid as first comonomer and from 70 to 30% by weight of at least one ester of the formula I as second comonomer.

5. A process for preparing a thixotropic agent as claimed in claim 1, which comprises first dissolving the ethylene terpolymer wax in one or more solvents compatible with the ethylene terpolymer wax and then adding at least one second solvent incompatible with the ethylene terpolymer wax.

6. A coating material comprising at least one thixotropic agent as claimed in claim 1.

7. A metallic paint comprising at least one thixotropic agent as claimed in claim 1.

8. A process for preparing a coating material or metallic paint by mixing in a thixotropic agent as claimed in claim 1.

9. A surface coated with a coating material or metallic paint comprising at least one thixotropic agent as claimed in claim 1.

* * * * *